(12) United States Patent
Carter

(10) Patent No.: US 6,516,332 B1
(45) Date of Patent: *Feb. 4, 2003

(54) FLOATING POINT NUMBER DATA PROCESSING MEANS

(75) Inventor: Robert Carter, Wilmslow (GB)

(73) Assignee: Siemens plc, Bracknell (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,703

(22) Filed: Sep. 2, 1997

(30) Foreign Application Priority Data

Sep. 2, 1996 (GB) .............................. 9618262
Aug. 29, 1997 (GB) .............................. 9718171

(51) Int. Cl.$^7$ ................................................ G06F 7/48
(52) U.S. Cl. ..................................... 708/495
(58) Field of Search ........................ 364/748.01–748.2; 708/495–510, 235

(56) References Cited

U.S. PATENT DOCUMENTS

| | | | |
|---|---|---|---|
| 3,825,895 A | | 7/1974 | Larsen et al. ............. 340/146.2 |
| 3,829,673 A | * | 8/1974 | Bouton, Jr. et al. ......... 708/508 |
| 3,875,392 A | * | 4/1975 | Keeler, II ................... 708/604 |
| 4,075,704 A | * | 2/1978 | O'Leary ................ 364/748.13 |
| 4,495,590 A | * | 1/1985 | Mitchell, Jr. ................ 708/232 |
| 4,590,584 A | * | 5/1986 | Yaguchi et al. ......... 364/748.04 |
| 4,677,610 A | | 6/1987 | Padgett ........................ 370/62 |
| 4,831,573 A | * | 5/1989 | Norman ..................... 364/716 |
| 4,931,974 A | * | 6/1990 | Ngou et al. ............ 364/748.14 |
| 5,027,272 A | | 6/1991 | Samuels ..................... 364/200 |
| 5,081,573 A | | 1/1992 | Hall et al. ................... 395/800 |
| 5,086,405 A | * | 2/1992 | Chung et al. ............... 708/505 |
| 5,182,723 A | * | 1/1993 | Kamimura ............. 364/748.19 |
| 5,257,215 A | * | 10/1993 | Poon .......................... 708/235 |
| 5,602,769 A | * | 2/1997 | Yu et al. ..................... 708/235 |
| 5,666,301 A | * | 9/1997 | Makino ................. 364/748.01 |
| 5,724,276 A | * | 3/1998 | Rose et al. ................. 708/235 |
| 5,764,548 A | * | 6/1998 | Keith et al. ............. 364/748.01 |
| 5,764,556 A | * | 7/1998 | Stiles .......................... 708/507 |
| RE35,977 E | * | 12/1998 | Cliff et al. .................. 708/235 |

FOREIGN PATENT DOCUMENTS

| | | |
|---|---|---|
| EP | 0 177 279 A2 | 4/1986 |
| EP | 0 456 475 A2 | 11/1991 |

OTHER PUBLICATIONS

"A Floating Point Arithmetic Unit", L.J. Bental (XP–002074945) Electronic Engineering) Mar. 1962 — pp.144–147.

"Floating–Point Dynamic–Variable–Range–Multiple–Precision Operators", (XP–002074946) Electronics Letter, Apr. 20, 1972, vol. 8, No. 8, pp. 191–193.

"Teaching ASIC Design with FPGAs", David M. Perkins and Peter C.M. Burton (XP–002074947) IEEE—pp. 271–274.

"Increase Z8000 power with floating–point routines" Robert Grappel and Jack Hemenway, EDN—Apr. 20, 1980, pp. 179–185.

"Avoiding Coprocessor Bottlenecks" Mauro Bonomi, BYTE, Mar. 1988, pp. 197–204.

"Interfacing a hardware multiplier to a general–purpose microprocessor" AC Davies and YT Fung, 2407 Microprocessors and Microsystems 1(1977) Oct., No. 7,London, GB, pp. 425–431.

* cited by examiner

*Primary Examiner*—David H. Malzahn
(74) *Attorney, Agent, or Firm*—Crowell & Moring LLP

(57) ABSTRACT

The floating point number data processing means is for use in microprocessor systems and finds application in AC motor drive technology.

Figures 1, 4:
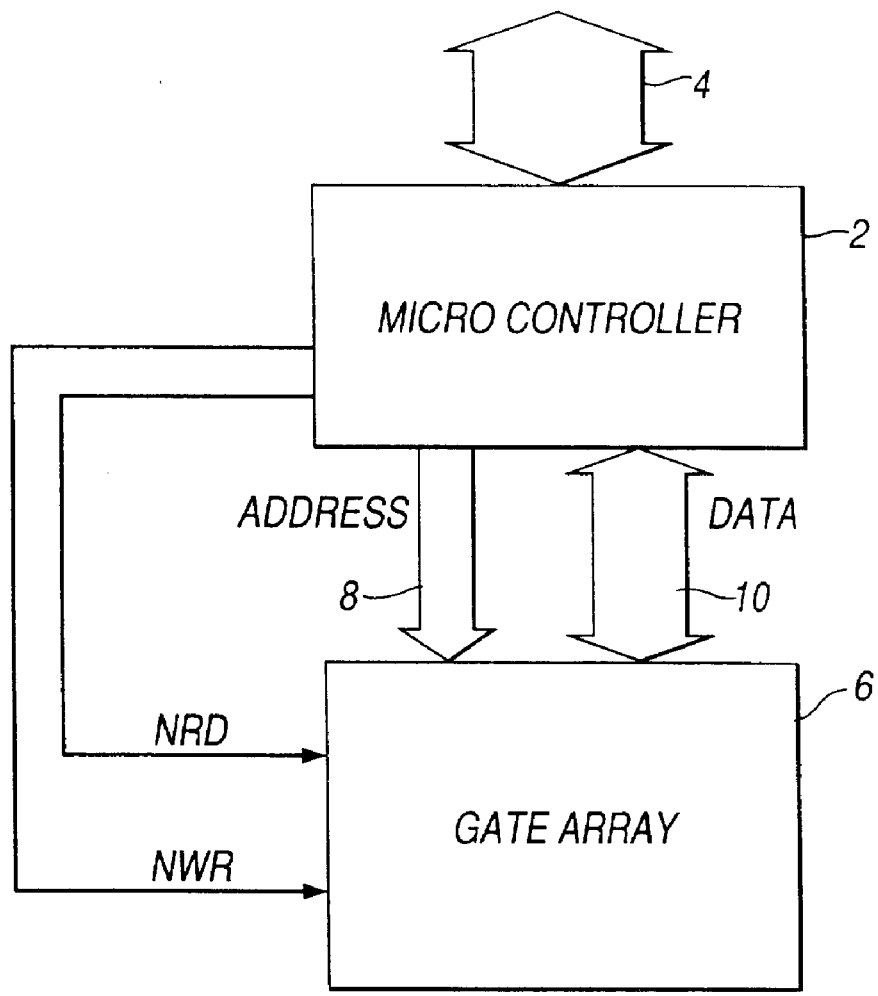

The format used includes a sign bit, a seven bit signed exponent and an eight bit mantissa.

The mathematical functions are performed in a gate array using registers which are mapped into a memory of the microprocessor system, the particular mathematical function being dependent upon a particular choice of registers. An unsigned integer comparison of floating point numbers is used to give a correct result.

10 Claims, 3 Drawing Sheets

| MULDIV | SUBDIV | FUNCTION | OUTPUT |
|--------|--------|----------|--------|
| 0 | 0 | ADD | A + B |
| 0 | 1 | SUBTRACT | A - B |
| 1 | 0 | MULTIPLY | A * B |
| 1 | 1 | DIVIDE | A / B |

FLOATING POINT NUMBER DATA PROCESSING MEANS

The present invention relates to floating point number data processing means for use with microprocessor systems and in particular to a low precision floating point number format.

The present invention finds application in AC motor drive technology where, for example, a small motor may draw half an amp of current and a large motor may draw 200 amps of current, and the frequency range of such motors is very large.

Many known floating point systems are realised in pure software. This is a slow process, typically taking tens or hundreds of micro-seconds per operation.

Existing microcontrollers use integer arithmetic. In many control applications, the range of variables results in a scaling calculation at every calculation step in order to maintain accuracy while avoiding overflow. Floating point variables and arithmetic solve this problem.

Floating point mathematics hardware is available to the universally accepted IEEE format. The standard precision for this format requires 4 or 5 bytes storage as mentioned above. The range and accuracy of these numbers far exceeds most control requirements. The hardware to implement mathematic functions is complex and operates slowly. Several memory operations are required to load each operand into the floating point unit and the result out.

A floating point comparison, e.g. the control statement if (A<B) then, requires a full floating point subtraction and inspection of the sign of the result. This very common control function becomes rather time consuming.

An aim of the present invention is to provide means for performing operations on a floating point number format which does not suffer from the above disadvantages experienced in the prior art.

According to the present invention there is provided means for performing operations with respect to a floating point number format, comprising n bits of data, where n is substantially smaller than known formats, wherein said means is a data processing means which operates upon said format combinatorially.

The format comprises a sign bit, a 7 bit signed exponent, and an 8 bit mantissa.

The format is designed such that an unsigned integer comparison of floating point numbers yields the correct result.

The data processor may be a microprocessor system having an associated gate array.

Figure 2:
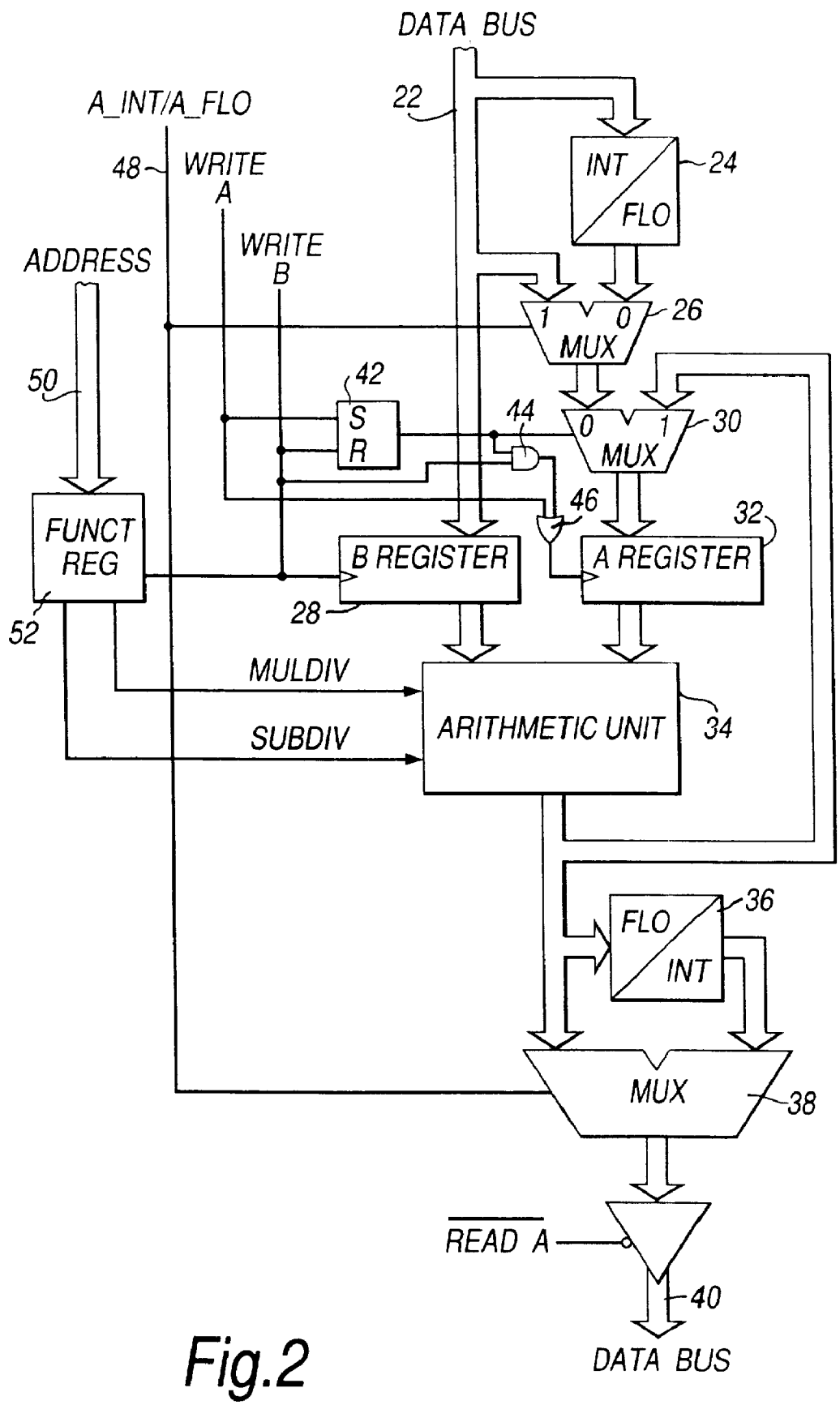
Figure 3:
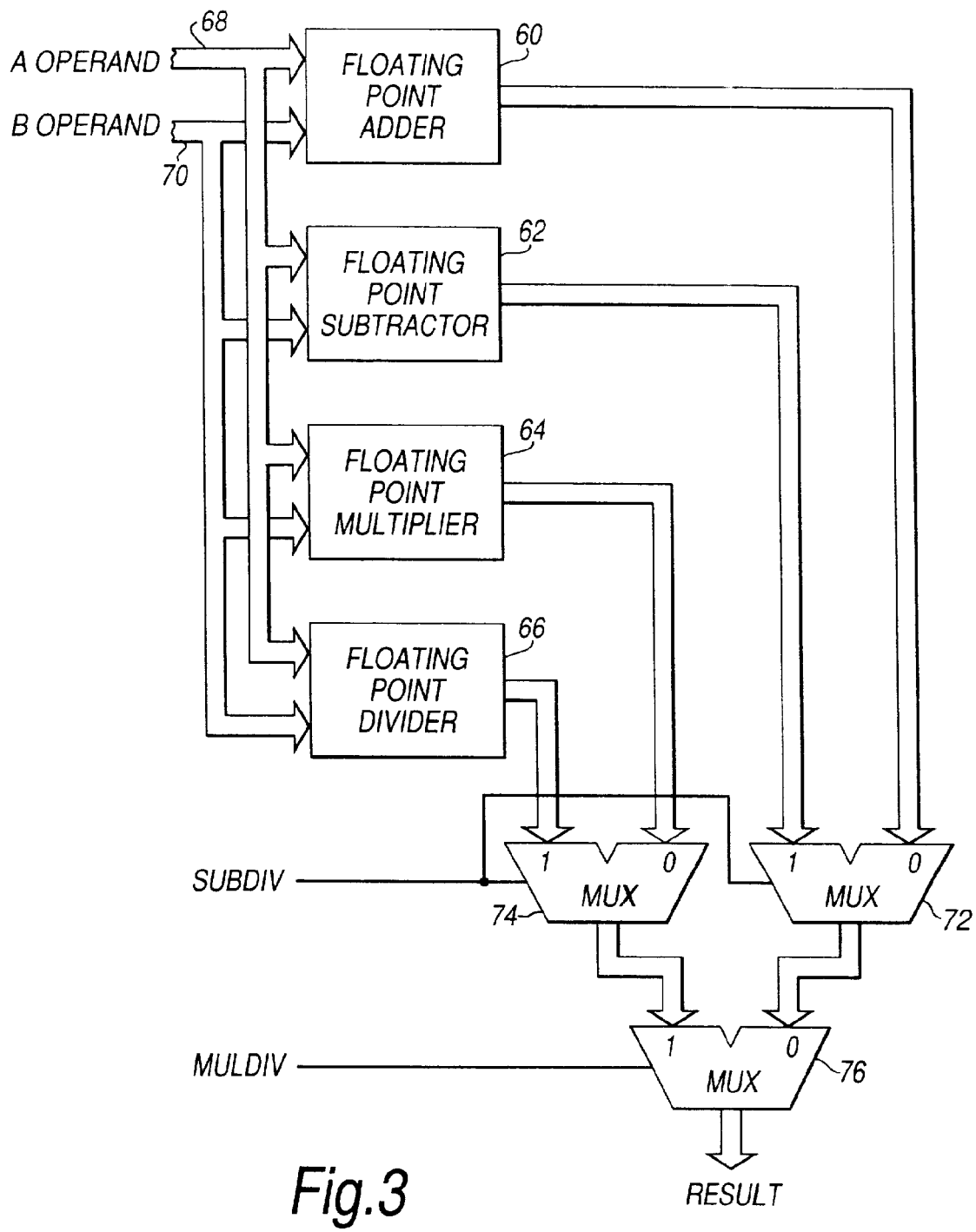

An embodiment of the invention will now be described, with reference to the accompanying drawings, in which:

FIG. 1 shows a block diagram of a system including a microcontroller, gate array and a flash floating point processor, FIG. 2 shows a block diagram of one implementation of a flash floating point processor, FIG. 3 shows a block diagram of an arithmetic unit, and FIG. 4 shows a table of the arithmetic unit functions.

The floating point format has a sign bit, a 7 bit signed exponent, and an 8 bit mantissa. The mantissa has an assumed 9th bit. The resultant 16 bits is a single memory location or data transfer operation in a 16 bit microcontroller. When one further requires that an unsigned integer comparison of floating point numbers should be correct, this leads to the following format: where

| | |
|---|---|
| bit 15 is a sign bit, | 1 = positive. If 0, invert all other bits |
| bit 14 is an exponent sign, | 1 = positive |
| bits 13–8 is the exponent, | note whole exponent is 2's complement with sign bit inverted, and, |
| bits 7–0 is the mantissa, | note effective 9 bit mantissa. Add 256 to this number. |

Examples of this format are as follows:

FFFF is $+(255+256)/256*2^{63}=+1.841E19$ (largest possible number);

C000 is $+(0+256)/256*2^{0}=+1$;

8000 is $+(0+256)/256*2^{-64}=+5.421E-20$ (smallest possible number);

−1 would be 3FFF

II would be $C192=+(146+256)/256*2^{1}=3.140625$. (0.03% error).

The range of numbers which can be calculated is:

$+/-5.4 \times 10^{-20}$ to $1.84 \times 10^{19}$ with an accuracy of 0.2%

All numbers and calculation results are correct to between 1/512 and 1/1024 thus giving a basic accuracy of 0.2%.

An implementation of this floating point format is performed by a range of mathematical functions in a gate array with registers mapped into the memory range of an associated microcontroller. This implements all functions combinatorially and the function is determined by register choice. For example, to add two numbers, write operand 1 to the floating point A accumulator, write operand 2 to the floating point B add register, read the result from the floating point A accumulator.

These registers are memory mapped leading to very fast data throughput.

Because of the reduced accuracy, only approximately 3K gates are required to perform +−*/functions. Additionally, floating point to integer and integer to floating point conversion functions are integrated.

To speed up multi-step calculations, if the A accumulator is not written between calculations, the previous calculation result is latched into the A accumulator so calculations are executed at the rate at which the B register can be written to. Thus, a sustainable 5 megaflop performance is achieved.

Referring to FIG. 1, there is shown a micrcontroller (2) having a highway connection (4) to a motor drive system. The microcontroller (2) is connected to a gate array (6) which includes a flash floating point processor. The connection to the gate array (6) is made by a four bit address highway (8) and a sixteen bit data highway (10). Two further control signals, NRD and NWR are provided by the microcontroller (2) to the gate array (6). The gate array including the flash floating point processor unit is mapped into the memory space of the microcontroller, and as this is a cominatorial system no clock connection is needed between the microcontroller and the flash floating point processor.

Referring to FIG. 2 there is shown an implementation of a flash floating point processor. A data bus 22 is connected to a first converter 24, inputs of a first multiplexer 26 and a B register 28. The first converter 24 has its output connected to further inputs of the first multiplexer 26. The output of the first multiplexer 26 is connected to inputs of a second multiplexer 30, and the outputs thereof are connected to an A register 32. The outputs of the registers 28 and 32 are connected to an arithmetic unit, the output of which is fed back to further inputs of the second multiplexer 30. The output of the arithmetic unit 34 is also fed to a second converter 36 and to inputs of a third multiplexer 38. The output of the second converter 36 is applied to further inputs of the multiplexer 38. Output signals from the third multiplexer 38 are fed out to a data bus 40 under control of a READ A signal.

WRITE A and B signals are applied to the A and B registers 32, 28 and the second multiplexer 30 by means of associated latching and gating circuitry 42–46. An A‾INT/A‾FLO control signal is applied over line 48 to the first multiplexer 26 and the third multiplexer 38. Address information is passed over a highway 50 to a function register 52, which receives the WRITE B control signal and generates two output signals MULDIV, SUBDIV, which are applied to the arithmetic unit 34.

The converter 24 designated INT/FLO is a hardware converter between the 16 bit unsigned integers on highway 22 and the floating point number format multiplexer 26 which uses the address information (A‾INT/A‾FLO) on line 48 to determine whether to choose a floating point number from the data bus or an integer from the INT/FLO, converter 34 thus allowing unsigned integers to be written directly to the flash floating point processor.

The multiplexer 30 selects either the data bus contents or the previous floating point output to be written into the A register 32. If the B register 28 is written twice in succession, the previous floating point output is written into the A register 32 at the same time as the new operand is written into the B register 28.

The output of floating point arithmetic unit 34 does not need to be latched because its inputs are latched, and therefore the output remains stable until one of registers 28, 32 are written into. The FLO/INT converter 36 is a hardware converter positioned between the floating point number format and the 16 bit unsigned integers. This converter 36 and the arithmetic unit 34 are fully combinatorial, containing no latches, flip-flops or loop structures of any kind.

Referring to FIG. 3 there is shown a block diagram of the arithmetic unit 34 in FIG. 2. The arithmetic unit comprises a floating point adder 60, a floating point subtractor 62, a floating point multiplier 64 and a floating point divider 66, all of which receive respective A operand signals on highway 68 and B operand signals on highway 70. The outputs from the adder 60 and the subtractor 62 are applied to a multiplexer 72, and the outputs of the multiplier 64 and divider 66 are applied to the inputs of a multiplexer 74. The outputs of the multiplexer 72 and 74 are applied to a further multiplexer 76 which generates the output signals of the arithmetic unit. The multiplexers 72 and 74 receive the SUBDIV control signal and the multiplexer 76 receives the MULDIV control signal. These signals are shown in the table of FIG. 4, and together determine the function of the arithmetic unit and the required output from the arithmetic unit.

It will be appreciated by those skilled in the art that there are other ways of implementing the present invention which fall within the scope of the following claims.

What is claimed is:

1. An apparatus for performing mathematical operations upon numbers in a floating point format having n bits of data where n is substantially smaller than known formats, said apparatus comprising a data processor programmed to perform mathematical operations by means of combinational logic which operates upon said numbers in said floating point format; wherein said data processor has a gate array which includes a plurality of floating point operator units for performing the mathematical operations of addition, subtraction, multiplication and division; and selection means for selecting an output from the floating point operator units in accordance with a desired mathematical operation;

said gate array including two inputs on which two numbers on which the mathematical operations are to be performed are input;

said plurality of floating point operator units comprising an adder, a subtractor, a multiplier and a divider, each of said adder, subtractor, multiplier and divider being connected to said two inputs and operable for providing an output; and said selection means comprising a first multiplexer for receiving the outputs from said adder and said subtractor, a second multiplexer for receiving the outputs from said multiplier and said divider, and a third multiplexer for receiving respective outputs from said first and second multiplexers, said outputs from said first, second and third multiplexers being selected in accordance with control signals applied thereto in accordance with the desired mathematical operation.

2. The apparatus as claimed in claim 1, wherein the floating point format comprises a sign bit, a seven bit signed exponent, and an eight bit mantissa.

3. The apparatus as claimed in claim 1, wherein said data processor further comprises means for performing an unsigned integer comparison of floating numbers.

4. The apparatus as claimed in claim 1, further comprising:

means for latching a calculated result into a first operator unit, if the first operator unit is not written to between calculations.

5. An apparatus for performing mathematical operations upon numbers in a floating point format having n bits of data for a system, the apparatus comprising:

a microcontroller having means for communicating with the system;

a memory contained in the microcontroller;

a gate array coupled in communication with said microcontroller, said gate array including a flash floating point processor unit that performs said mathematical operations in said floating point format in response to control signals generated by said microcontroller in accordance with a desired mathematical operation, said flash floating point processor unit including a plurality of floating point operator units for performing the mathematical operations of addition, subtraction, multiplication and division; and selection means for selecting an output from the floating point operator units in accordance with a desired mathematical operation; wherein, said gate array includes two inputs on which two numbers on which the mathematical operations are to be performed are input;

said plurality of floating point operator units comprises an adder, a subtractor, a multiplier and a divider, each of said adder, subtractor, multiplier and divider being connected to said two inputs and operable for providing an output; and said selection means comprises a first multiplexer for receiving the outputs from said adder and said subtractor, a second multiplexer for receiving the outputs from said multiplier and said divider, and a third multiplexer for receiving respective outputs from said first and second multiplexers, said outputs from said first, second and third multiplexers being selected in accordance with control signals applied thereto in accordance with the desired mathematical operation.

6. An AC motor drive system comprising an apparatus for performing mathematical operations upon numbers in a floating point format having n bits of data where n is substantially smaller than known formats, said apparatus comprising:

a gate array which includes a plurality of floating point operator units for performing the mathematical operations of addition, subtraction, multiplication and division; and selection means for selecting an output from the floating point operator units in accordance with a desired mathematical operation; wherein, said gate array includes two inputs on which two numbers on which the mathematical operations are to be performed are input;

said plurality of floating point operator units comprises an adder, a subtractor, a multiplier and a divider, each of said adder, subtractor, multiplier and divider being connected to said two inputs and operable for providing an output; and said selection means comprises a first multiplexer for receiving the outputs from said adder and said subtractor, a second multiplexer for receiving the outputs from said multiplier and said divider, and a third multiplexer for receiving respective outputs from said first and second multiplexers, said outputs from said first, second and third multiplexers being selected in accordance with control signals applied thereto in accordance with the desired mathematical operation.

7. An AC motor drive system comprising an apparatus for performing mathematical operations upon numbers in a floating point format having n bits of data, comprising:

a microcontroller having means for communicating with a system for which mathematical operations are to be performed;

a gate array coupled in communication with said microcontroller, said gate array including a plurality of floating point operator units for performing the mathematical operations of addition, subtraction, multiplication and division; and selection means for selecting an output from the floating point operator units in accordance with a desired mathematical operation; wherein, said sate array includes two inputs on which two numbers on which the mathematical operations are to be performed are input;

said plurality of floating point operator units comprises an adder, a subtractor, a multiplier and a divider, each of said adder, subtractor, multiplier and divider being connected to said two inputs and operable for providing an output; and said selection means comprises a first multiplexer for receiving the outputs from said adder and said subtractor, a second multiplexer for receiving the outputs from said multiplier and said divider, and a third multiplexer for receiving respective outputs from said first and second multiplexers, said outputs from said first, second and third multiplexers being selected in accordance with control signals applied thereto in accordance with the desired mathematical operation.

8. An apparatus for performing mathematical operations upon numbers in floating point format having n bits of data where n is substantially smaller than known formats, said apparatus comprising:

a gate array which includes a plurality of floating point operator units for performing the mathematical operations of addition, subtraction, multiplication and division; and selection means for selecting an output from the floating point operator units in accordance with a desired mathematical operation; wherein, said gate array includes two inputs on which two numbers on which the mathematical operations are to be performed are input;

said plurality of floating point operator units comprises an adder, a subtractor, a multiplier and a divider, each of said adder, subtractor, multiplier and divider being connected to said two inputs and operable for providing an output; and said selection means comprises a first multiplexer for receiving the outputs from said adder and said subtractor, a second multiplexer for receiving the outputs from said multiplier and said divider, and a third multiplexer for receiving respective outputs from said first and second multiplexers, said outputs from said first, second and third multiplexers being selected in accordance with control signals applied thereto in accordance with the desired mathematical operation.

9. An AC motor drive system comprising an apparatus for performing mathematical operations upon numbers in floating point format having n bits of data where n is substantially smaller than known formats, said apparatus comprising:

a gate array which includes a plurality of floating point operator units for performing the mathematical operations of addition, subtraction, multiplication and division; and selection means for selecting the output from the floating point operator units in accordance with the desired mathematical operation;

wherein said selection means comprises a first multiplexer for receiving the outputs from said adder and said subtractor, a second multiplexer for receiving the outputs from said multiplier and said divider, and a third multiplexer for receiving respective outputs from said first and second multiplexers, said outputs from said first, second and third multiplexers being selected in accordance with control signals applied thereto in accordance with a desired mathematical operation.

10. The apparatus as claimed in claim 9, wherein said plurality of floating point operator units comprises an adder, a subtractor, a multiplier and a divider, each of said adder, subtractor, multiplier and divider being connected to inputs of said date array.

* * * * *